United States Patent
Pianca et al.

[11] Patent Number: 5,829,700
[45] Date of Patent: Nov. 3, 1998

[54] CONTRAST CUTTER, PARTICULARLY FOR FORAGE SHREDDING MACHINES

[76] Inventors: Luciano Pianca, Via Vendrame, 2-31014 Colle Umberto (Prov. of Treviso); Graziano Pianca, Via Aliprandi, 20-31015 Conegliano Prov. of Treviso), both of Italy

[21] Appl. No.: 697,394

[22] Filed: Aug. 27, 1996

[30] Foreign Application Priority Data

Sep. 1, 1995 [IT] Italy ................................ PN950034 U

[51] Int. Cl.⁶ ............................................... B02C 18/18
[52] U.S. Cl. ........................................ 241/300.1; 241/242
[58] Field of Search ............................... 83/856, 698.41; 241/242, 243, 300, 292.1, 197, 300.1

[56] References Cited

U.S. PATENT DOCUMENTS 3,779,123 12/1973 Chafee ................................ 241/243 X
3,805,660 4/1974 Burrough .
4,015,782 4/1977 Granite ................................ 241/243

FOREIGN PATENT DOCUMENTS

| 22053 | 1/1981 | European Pat. Off. . |
| 1 018 44 | 3/1984 | European Pat. Off. . |
| 2 513 848 | 4/1983 | France . |
| 2 167 233 | 1/1982 | Germany . |

*Primary Examiner*—Mark Rosenbaum
*Attorney, Agent, or Firm*—Guido Modiano; Albert Josif

[57] ABSTRACT

Contrast cutter, particularly for forage shredding machines, comprising a monolithic bar that has a horizontal seat that is specially shaped, is obtained by milling, and accommodates a set of tool-locking inserts and tools made of sintered material capable of absorbing impacts and abrasions of various kinds, nonetheless allowing to partially replace the tools in case of breakage by loosening appropriate screw-type means for locking said strips to said monolithic bar that constitutes the contrast cutter.

6 Claims, 2 Drawing Sheets

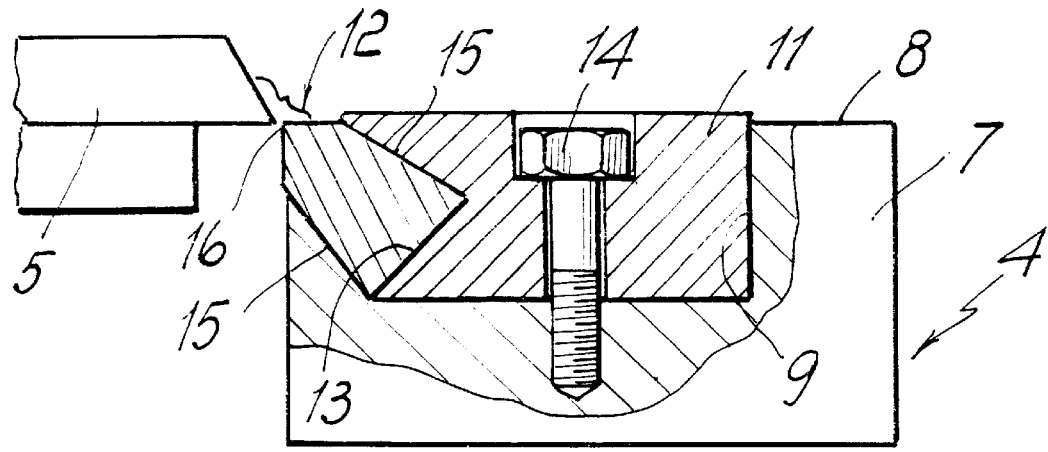
Fig.3
Fig.5
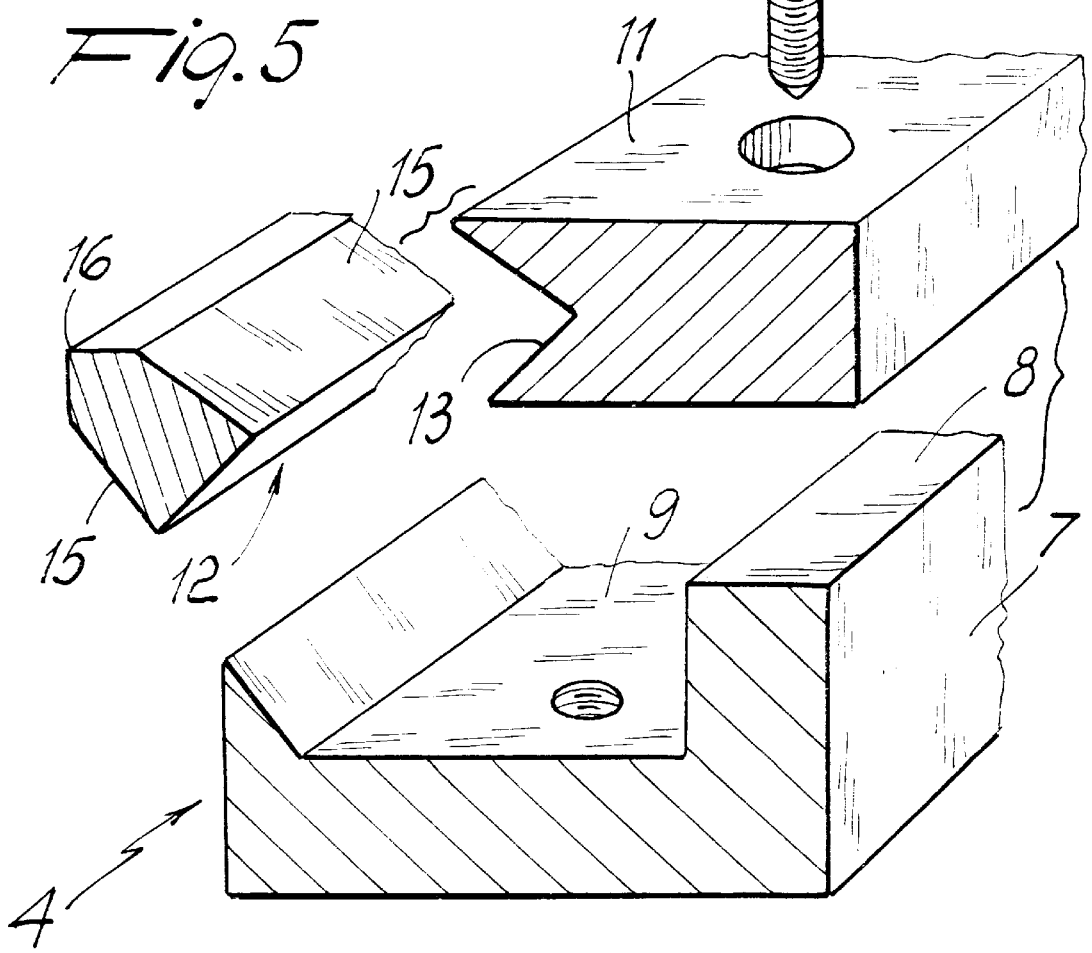

CONTRAST CUTTER, PARTICULARLY FOR FORAGE SHREDDING MACHINES

BACKGROUND OF THE INVENTION

The present invention relates to a contrast cutter, particularly for forage shredding machines.

It is known that in the current state of the art, specific farm machines, known as combined shredder-loader-harvesters, are used to shred forage for cattle feeding.

Said self-propelled shredder-loaders comprise a per se known apparatus adapted to convey the product to be shredded towards a shredding drum, where the product is compressed by feeder rollers and then cut.

This operation is performed by means of a conventional contrast cutter that is fixed to the chassis of the machine and is in any case arranged at such a distance as not to interfere with the rotary motion of the blade supporting drum.

Said contrast cutter, which is provided to the product to be processed as an abutment shoulder for the shearing stress, is constituted by a conventional monolithic metal bar that has an applied edge made of tougher metal.

The drawbacks that occur in most cases are related to the wear of said added part, caused by the presence of silica-based soils in the product to be processed.

The product is in fact collected and conveyed towards the cutting assembly by means of a collecting platform that skims the cultivated soil, and therefore everything that it encounters during its advancement is of course conveyed towards said cutting assembly.

In the most extreme cases, the introduction of stones or ferrous rigid bodies entails the partial or complete breakage of said contrast cutter and of the blades, consequently disabling the machine.

Indeed, if the contrast cutter is not in perfect operating condition, it requires the motor to consume more power, with a consequent reduction in the amount of shredded product and poor cutting quality.

SUMMARY OF THE INVENTION

Therefore, the aim of the invention is to provide a new contrast cutter that is capable of absorbing any kind of resistance produced by hard bodies under the shredding action performed by the blade supporting drum.

An object is to provide a contrast cutter that has appropriate refinements, so as to retain a contrast tool for the drum cutter blades that is interchangeable in case of breakage, without however having to eliminate the entire bar of said contrast cutter.

Another object is to provide a contrast tool by using commercially available hard metal so as to extend its working life.

This aim and these objects are achieved by a contrast cutter, particularly for forage shredding machines, characterized in that it comprises a monolithic bar that has a substantially rectangular cross-section and has, on at least one of its horizontal flat faces and along its entire extension, an appropriate seat that is obtained by milling and accommodates one or more inserts having, on a longitudinal face, a slot that is capable of retaining a metal strip that is as long as said insert, said strip having a cross-section with multiple sides that are appropriately inclined so that they can be retained and locked to said monolithic bar by means of fixing screws with which said inserts are provided.

BRIEF DESCRIPTION OF THE DRAWINGS

Further characteristics and advantages of the invention will become apparent from the detailed description of a preferred but not exclusive embodiment thereof, illustrated only by way of non-limitative example in the accompanying drawings, wherein:

FIG. 3 is a sectional view of the contrast cutter;

FIG. 5 is an exploded perspective view of the components of the contrast cutter.

DESCRIPTION OF THE PREFERRED EMBODIMENTS

Figure 1:
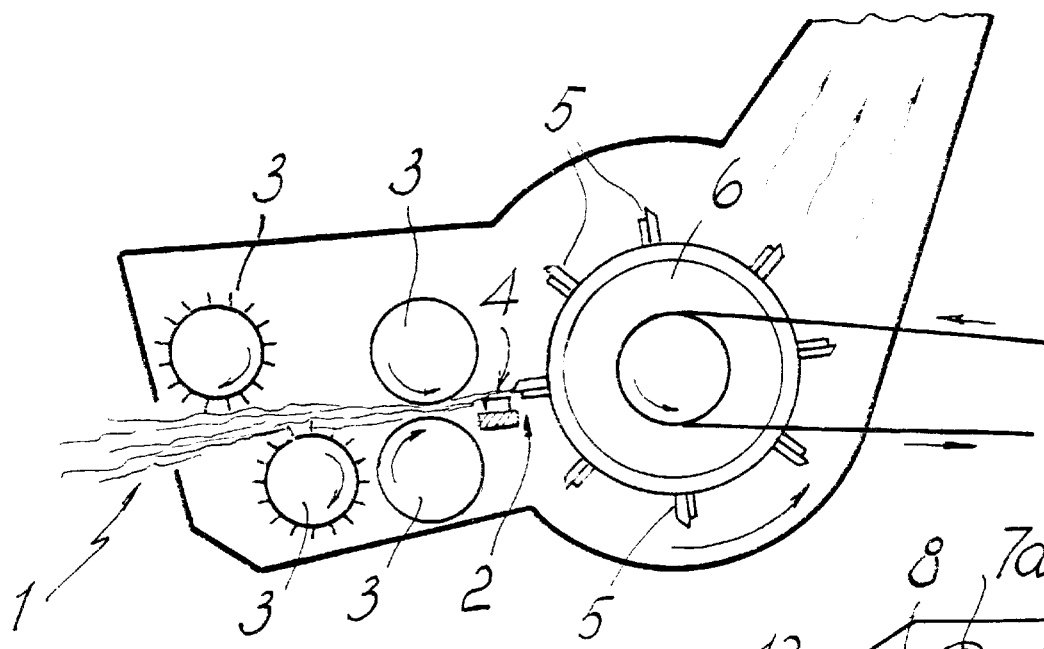
FIG. 1 is a schematic view of the region where the contrast cutter is located in a conventional shredding machine.
Figure 2:
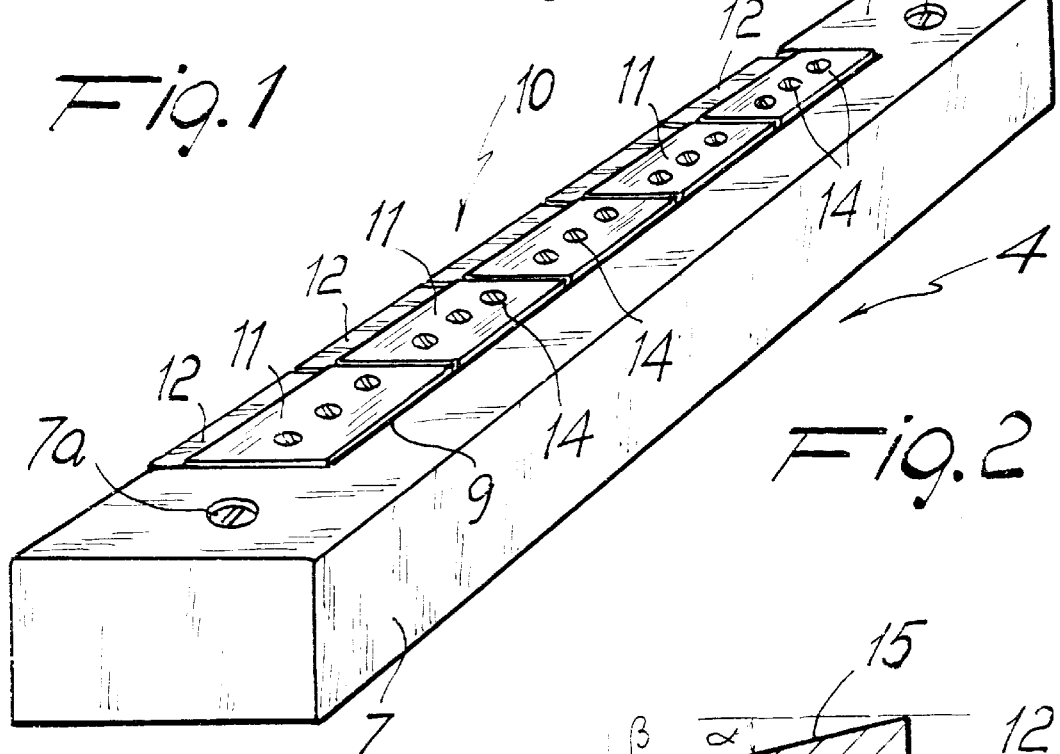
FIG. 2 is a perspective view of the entire structure of the contrast cutter with its components.
Figure 4:
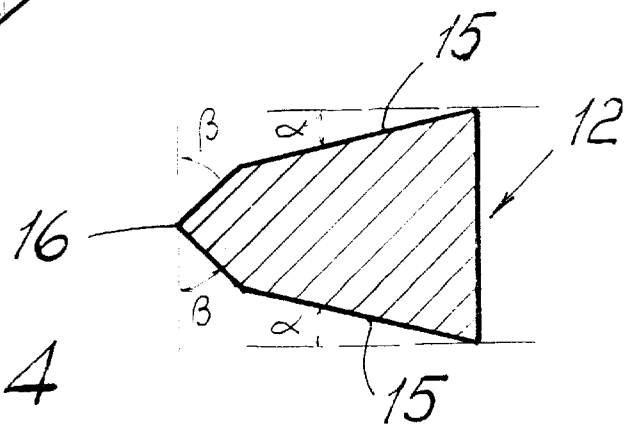
FIG. 4 is a sectional view of the cutting bar.

With reference to FIG. 1, the operating arrangement of a conventional shredding operation for a generic type of forage consists in conveying the product 1 toward a shredding apparatus 2 that is constituted by multiple sets of conveyor and presser rollers 3.

The product thus conveyed arrives at the contrast cutter 4 so that it is cut by the blades 5 of the rotating drum 6. The contrast cutter 4 according to the invention is constituted by a monolithic bar 7 that is fixed to the shredding machine by means of conventional bolts 7a.

A set 10, constituted by multiple locking inserts 11 for one or more strips 12, is accommodated on one of the two longitudinal flat faces, designated by the reference numeral 8, in an appropriately provided seat 9 obtained by milling.

Said strips 12 constitute the part of the contrast cutter that absorbs all the stresses of the cutting thrust and the wear of the product to be shredded.

As shown in FIG. 3, said strips 12 are associated with the monolithic bar 7 by virtue of the inserts 11, provided with a seat 13 that is shaped complementarily to the cross-section of the strips 12. This is done to prevent their separation under the product cutting stress.

The reference numeral 14 designates the screw element that is adapted to ensure the locking of the strips 12 and the consequent fixing of each insert 11, so as to constitute a unit together with said monolithic bar 7. Said fixing system also allows to achieve the above stated aim.

Indeed, if a strip element 12 breaks or wears out, it can be replaced conveniently by loosening one or more fixing screws 14 that lock the insert 11 to the monolithic body 4, thus allowing to extract the defective strip without disassembling the entire contrast cutter.

Said strips 12 are made of synthetic materials consisting substantially of sintered hard metals; this allows to achieve a high hardness quality that is capable of absorbing impacts and stresses of various kinds and also to achieve good resistance to the wear caused by the presence of silica-containing soil in the product to be shredded.

Said strips 12 are also conveniently shaped so as to have lateral facets, designated by the reference numeral 15, that are adequately inclined at an angle $\alpha$ that is smaller than 90°; said facets meet toward the tip 16, i.e., the point that almost makes contact with the cutting tool 5, by means of further facets inclined at an angle $\beta$ of 45°.

The above description shows that the intended aim and all the objects have been widely achieved.

First of all, the aim has been achieved of providing a bar for a shredding machine that is reliable in practical use and is capable of absorbing impacts and abrasions of various kinds indeed because appropriate sets of tools are used.

Another object that has been achieved is that the use of tools that can be replaced easily and locally in case of breakage has been devised.

A further object that has been achieved is the provision of a tool-holding contrast cutter provided with appropriate tools made of sintered material, so as to achieve perfect cutting of the forage with a lower power consumption on the part of the machine.

Some variations may of course be necessary in the practical execution of the invention without departing from its concept; likewise, the materials used and the dimensions may be any according to the requirements.

What is claimed is:

1. A contrast cutter for forage shredding machines, comprising:

a monolithic bar having a substantially rectangular cross-section, said bar defining at least one horizontal face thereof and an upper surface, parallel to said horizontal face;

a seat being provided on said bar face;

at least one insert being accommodated in said seat, said at least one insert having on a longitudinal face thereof a slot;

at least one tool strip being retained in said slot, said at least one strip being as long as said at least one insert and having a cross-sectional shape with multiple sides, said sides being inclined for being retained and locked to said bar; and fixing means provided at said inserts for locking said at least one strip to said bar;

wherein said at least one tool strip has lateral facets inclined at an angle and meeting towards a tip of the tool strip, said tip protruding from an outline of said bar, said at least one insert being applied in said seat and protruding from said upper surface of said bar and from an upper surface of said at least one tool strip which is flush with said upper surface of the bar.

2. A contrast cutter according to claim 1, wherein said seat for accommodating tool-holder inserts is provided on said at least one horizontal face of the bar.

3. A contrast cutter according to claim 1, wherein said tool-holder inserts have, on one longitudinal face, said slot that is constituted by two flat portions, said flat portions forming an angle for partially locking said tool strip.

4. A contrast cutter according to claim 3, wherein the sides of said strips comprise a first and a second side arranged at an angle and adapted to abut against the two flat portions of said slot, a third side which abuts against a portion of the seat of the bar, and a fourth and a fifth sides arranged at another angle and being free of contact with said bar and with said slot of the insert.

5. A contrast cutter according to claim 1, wherein each insert is provided with two or more screws constituting said fixing means for fixing to the monolithic bar, whereby facilitating replacement of said inserts in case of localized breakage.

6. A contrast cutter according to claim 1, wherein said at least one tool strip is made of sintered material and is faceted appropriately so as to be locked, by means of the at least one insert, to the monolithic bar, said at least one insert and at least one strip forming a unit with said bar.

* * * * *